United States Patent
Uji

(10) Patent No.: US 7,914,608 B2
(45) Date of Patent: Mar. 29, 2011

(54) METHOD OF PROCESSING VOLATILE ORGANIC COMPOUND AND SYSTEM FOR PROCESSING VOLATILE ORGANIC COMPOUND

(75) Inventor: Shigekazu Uji, Ichikawa (JP)

(73) Assignee: Ishikawajima-Harima Heavy Industries Co., Ltd. (JP)

( * ) Notice: Subject to any disclaimer, the term of this patent is extended or adjusted under 35 U.S.C. 154(b) by 260 days.

(21) Appl. No.: 11/676,964

(22) Filed: Feb. 20, 2007

(65) Prior Publication Data

US 2007/0193447 A1 Aug. 23, 2007

(30) Foreign Application Priority Data

Feb. 22, 2006 (JP) ................. 2006-045074

(51) Int. Cl.
*B01D 53/02* (2006.01)
(52) U.S. Cl. ............... 95/141; 55/139; 55/143; 55/148
(58) Field of Classification Search .............. 95/141, 95/148, 143, 139, 113–121; 96/143, 146, 96/125; 60/39.461, 39.48; 588/320, 405
See application file for complete search history.

(56) References Cited

U.S. PATENT DOCUMENTS

| | | | |
|---|---|---|---|
| 4,919,692 A | | 4/1990 | Vara et al. |
| 5,256,208 A | * | 10/1993 | Rafson .................. 134/25.1 |
| 5,281,257 A | * | 1/1994 | Harris .................... 95/115 |
| 6,372,018 B1 | * | 4/2002 | Cowles .................. 95/18 |
| 2001/0037728 A1 | * | 11/2001 | Schimkat et al. ............... 95/113 |
| 2004/0147798 A1 | * | 7/2004 | MacWhinnie et al. ........ 588/213 |
| 2005/0109207 A1 | * | 5/2005 | Olander et al. ................ 95/141 |
| 2006/0124039 A1 | * | 6/2006 | Kanai .......................... 110/230 |

FOREIGN PATENT DOCUMENTS

| | | |
|---|---|---|
| DE | 28 47 714 | 5/1980 |
| DE | 342 31 69 | 1/1985 |
| DE | 40 03 668 | 8/1990 |
| EP | 1 788 222 | 5/2007 |
| JP | 54-061074 | 5/1979 |
| JP | 61-086927 | 5/1986 |
| JP | 61-086928 | 5/1986 |
| JP | 01-231924 | 9/1989 |
| JP | 2000-000425 | 1/2000 |
| JP | 2003-322324 | 11/2003 |
| JP | 2004-036492 | 2/2004 |
| JP | 2004-184003 | 7/2004 |

(Continued)

OTHER PUBLICATIONS

Office Action issued in counterpart Korean Patent Appln. No. 10-2007-0017171 with English translation.

(Continued)

*Primary Examiner* — Jason M Greene
*Assistant Examiner* — Karla Hawkins
(74) *Attorney, Agent, or Firm* — Ostrolenk Faber LLP

(57) ABSTRACT

Discharge gas containing a volatile organic compound is supplied to an adsorption apparatus, and the volatile organic compound adsorbed in the adsorbent is then desorbed from the adsorbent by the use of steam and mixed it with the steam, and finally, the steam mixed with the volatile organic compound is supplied under a pressurized environment to a combustion apparatus to thereby combust it with fuel gas.

14 Claims, 8 Drawing Sheets

FOREIGN PATENT DOCUMENTS

| | | |
|---|---|---|
| KR | 2001-0099169 | 11/2001 |
| SU | 16638 | 10/1930 |
| SU | 587961 | 1/1978 |
| SU | 931215 | 5/1982 |
| SU | 1020688 | 5/1983 |
| SU | 1286252 A1 | 1/1987 |
| SU | 1768249 | 10/1992 |

OTHER PUBLICATIONS

Japanese Unexamined Patent Application, First Publication No. 2000-000425 (Not enclosed herewith since it was previously submitted w/ English translation to the USPTO in an IDS dated Jul. 13, 2007).

European Search Report dated Jun. 18, 2007.

Official Action from Russian Patent Office in counterpart foreign application 2007106194/15 filed Feb. 19, 2007, dated May 8,2008, with English-language translation.

Russian Office Action, dated Apr. 8, 2009, issued in corresponding Russian Patent Application No. 2007106194, total 4 pages. English Translation attached, 4 pages.

Decision to Grant issued Aug. 3, 2009 in connection with corresponding Russian Patent Application No. 2007106194 with English Language translation.

* cited by examiner a | A:ADSORPTION、B:COMPRESSION b | A:ADSORPTION、B:DESORPTION c | A:ADSORPTION、B:DECOMPRESSION d | A:ADSORPTION、B:COOLING e | A:COMPRESSION, B:ADSORPTION f | A:DESORPTION, B:ADSORPTION g | A:DECOMPRESSION, B:ADSORPTION h | A:COOLING, B:ADSORPTION

METHOD OF PROCESSING VOLATILE ORGANIC COMPOUND AND SYSTEM FOR PROCESSING VOLATILE ORGANIC COMPOUND

BACKGROUND OF THE INVENTION

1. Field of the Invention

The present invention relates to a method of processing and a processing system of a gaseous volatile organic compound. The present application is based on Japanese Patent Application No. 2006-045074, filed Feb. 22, 2006, the content of which is incorporated herein by reference.

2. Description of the Related Art

In factories which use various types of volatile organic compounds such as toluene, xylene, or the like, there are serious concerns regarding disposal of the volatile organic compounds after use. If the amount of discharge or disposal is small, discharge gas containing the used volatile organic compounds may be discharged into the atmosphere within a range that falls below an environmentally acceptable value. However, if the discharge amount is large (which it is in the majority of cases), this is dealt with by providing separate type of equipment for treatment.

As a conventionally used method of processing, the discharge gas containing the volatile organic compound is firstly supplied to an adsorption apparatus where the volatile organic compound is adsorbed in an adsorbent. The adsorbent which has been adsorbed the volatile organic compound is then desorbed in steam so that the volatile organic compound is mixed with the steam. Next, steam which has adsorbed the volatile organic compound is condensed, and the condensed water is distilled so that the volatile organic compound and the water are separated. Finally, the volatile organic compound separated from the water is combusted and decomposed.

In the conventional treatment method, in addition to the cost necessary for constructing/installing a treatment facility, the running cost of the facility also increases. Accordingly, a technique has been proposed for processing and decomposing a volatile organic compound, without incurring extra costs, by using an existing gas turbine provided in a factory (see, for example, Japanese Unexamined Patent Applications, First Publications No. 2003-322324, No. 2004-036492, and No. 2004-184003).

In the invention disclosed in Japanese Unexamined Patent Application, First Publication No. 2003-322324, a hazardous substance generated from a volatile organic compound is scavenged therefrom, and supplied to an air intake port of a gas turbine, and then compressed along with air in a compressor. The compressed air containing the hazardous substance is supplied to a combustor and fuel gas is concurrently supplied thereto, and they are combusted to thereby drive a turbine. The hazardous substance is combusted in the combustor and thus rendered harmless, and then discharged into the atmosphere together with exhaust gas of the gas turbine.

In the inventions disclosed in Japanese Unexamined Patent Applications, First Publications No. 2004-036492 and No. 2004-184003, waste fluid containing a volatile organic compound is directly supplied to a combustor and fuel gas is concurrently supplied thereto, and they are combusted to thereby drive a turbine. The waste fluid containing a hazardous substance is combusted in the combustor and rendered harmless, and then discharged into the atmosphere together with the exhaust gas of the gas turbine.

However, in the above described treatment method, the following inconveniences are pointed out. In the invention disclosed in Japanese Unexamined Patent Application, First Publication No. 2003-322324, a structure thereof is such that the hazardous substance generated from the volatile organic compound is supplied to the air intake port of the gas turbine, however, a part of the intake air is not introduced to the combustor, but is used in the subsequent stage or in cooling the turbine. Therefore, some of the hazardous substance does not pass through the combustor. In other words, it is discharged from the gas turbine without being combusted, that is, it is not sufficiently treated. Further, in the inventions disclosed in Japanese Unexamined Patent Applications, First Publications No. 2004-036492 and No. 2004-184003, waste fluid with a high concentration of hazardous substance is directly supplied to the combustor, and therefore, there is concern that the flame temperature may become excessively high.

SUMMARY OF THE INVENTION

The present invention has been devised in consideration of the above circumstances, and has an object of rendering the volatile organic compound harmless, and in addition thereto entirely improving energy efficiency within a facility where treating the volatile organic compound is necessary.

In order to achieve the above object, according to the present invention, a method is provided as a first solution means according to a method of processing a volatile organic compound, comprising: adsorbing in an adsorbent a volatile organic compound contained in a gas to be treated; desorbing the volatile organic compound adsorbed in the adsorbent from the adsorbent by the use of steam and mixing it with the steam, under a pressurized environment; and combusting the steam mixed with the volatile organic compound.

As a second solution means according to the processing method of the volatile organic compound, a means is provided in the first solution means, wherein the steam is generated by the use of heat of combustion gas.

As a third solution means according to the processing method of the volatile organic compound, a means is provided in the first or second solution means, wherein adsorption of the volatile organic compound with respect to the adsorbent, and desorption of the volatile organic compound from the adsorbent are alternately carried out in parallel.

As a fourth solution means according to the processing method of the volatile organic compound, a means is provided in one of the first to third solution means, wherein some of the steam for desorbing the volatile organic compound from the adsorbent is supplied in a bypassing manner not to be supplied for desorption of the volatile organic compound.

As a fifth solution means according to the processing method of the volatile organic compound, a means is provided in one of the first to fourth solution means, wherein a pre-process for concentrating the volatile organic compound is applied to the gas to be treated, and thereafter, the volatile organic compound is adsorbed in the adsorbent.

As a sixth solution means according to the processing method of the volatile organic compound, a means is provided in the fifth solution means, wherein the pre-process comprises either one or both of (i) a concentration process in which the volatile organic compound contained in the gas to be treated is adsorbed in the adsorbent, and thereafter, the volatile organic compound is desorbed from the adsorbent by the use of hot gas to thereby be concentrated, and (ii) a dehumidifying process in which the water content is removed from the gas to be treated.

As a seventh solution means according to the processing method of the volatile organic compound, a means is provided in one of the first to sixth solution means, wherein the volatile organic compound is adsorbed in the adsorbent, and thereafter, the volatile organic compound in the adsorbent is heated by the use of hot gas before it is desorbed by the use of steam.

As a eighth solution means according to the processing method of the volatile organic compound, a means is provided in the sixth or seventh solution means, wherein the hot gas is discharge gas of combustion gas that has been supplied to generate steam.

As a ninth solution means according to the processing method of the volatile organic compound, a means is provided in the sixth or seventh solution means, wherein the hot gas is air that has been heated by heat transfer with discharge gas of combustion gas that has been supplied to generate steam.

According to the present invention, a processing system is provided as a first solving means according to a system for processing a volatile organic compound, comprising: an adsorption apparatus which adsorbs in an adsorbent a volatile organic compound contained in gas to be treated, and desorbs the volatile organic compound adsorbed in the adsorbent from the adsorbent by the use of steam and mixing it with the steam, under a pressurized environment; and a combustion apparatus which combusts the steam mixed with the volatile organic compound.

As a second solving means according to the processing system of the volatile organic compound, a means is provided in the first solving means, wherein the combustion apparatus comprises a steam generating apparatus that generates steam using heat of combustion gas.

As a third solving means according to the processing system of the volatile organic compound, a means is provided in the first or second solving means, wherein the adsorption apparatus comprises a plurality of adsorption units, and wherein the processing system further comprises a switching apparatus which switches said plurality of adsorption units so that adsorption of the volatile organic compound in the adsorbent, and desorption of the volatile organic compound from the adsorbent are alternately carried out in parallel.

As a fourth solving means according to the processing system of the volatile organic compound, a means is provided in one of the first to fourth solving means, further comprising: a steam bypass control valve which controls a flow of steam directly supplied to the combustion apparatus without being passed through the adsorption apparatus.

As a fifth solving means according to the processing system of the volatile organic compound, a means is provided in one of the first to fourth solving means, further comprising: a pre-processing apparatus for concentrating a volatile organic compound contained in the gas to be treated, before adsorbing the volatile organic compound in the adsorbent.

As a sixth solving means according to the processing system of the volatile organic compound, a means is provided in the fifth solving means, wherein the pre-processing apparatus comprises either one or both of (i) a concentrator where the volatile organic compound contained in the gas to be treated is adsorbed in the adsorbent, and thereafter, the volatile organic compound is desorbed from the adsorbent by the use of hot gas to thereby be concentrated, and (ii) a dehumidifier where the water content is removed from the gas to be treated.

As a seventh solving means according to the processing system of the volatile organic compound, a means is provided in one of the first to sixth solving means, wherein the volatile organic compound in the adsorbent is heated by the use of hot gas before it is desorbed by the use of steam.

As a eighth solving means according to the processing system of the volatile organic compound, a means is provided in the sixth or seventh solving means, wherein the hot gas is discharge gas of combustion gas supplied to generate steam.

As a ninth solving means according to the processing system of the volatile organic compound, a means is provided in the sixth or seventh solving means, further comprising: a heating apparatus where air is heated by heat transfer with discharge gas of combustion gas supplied to generate steam, and wherein the hot gas is the heated air discharged from the heating apparatus.

In the present invention, since the steam mixed with the volatile organic compound is supplied to and combusted in the combustion apparatus, the volatile organic compound can be rendered harmless. Further, it is possible to prevent the occurrence of a situation where a highly concentrated volatile organic compound is supplied to the combustion chamber so that the flame temperature becomes too high. Accordingly, energy efficiency can comprehensively be improved. Furthermore, by supplying the steam to the combustion apparatus, the amount of NOx in the combustion gas discharged from the combustion apparatus can be reduced, and as a result, deterioration of the surrounding environment due to NOx can be suppressed.

Moreover, by generating steam by the use of heat of the combustion gas discharged from the combustion apparatus and by supplying the thus-generated steam to the adsorption apparatus, energy necessary for generating the steam can be reduced as compared to a case in which steam is separately provided from another system.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE INVENTION

With reference to the drawings, embodiments of the present invention will now be described.

First Embodiment

Figure 1:
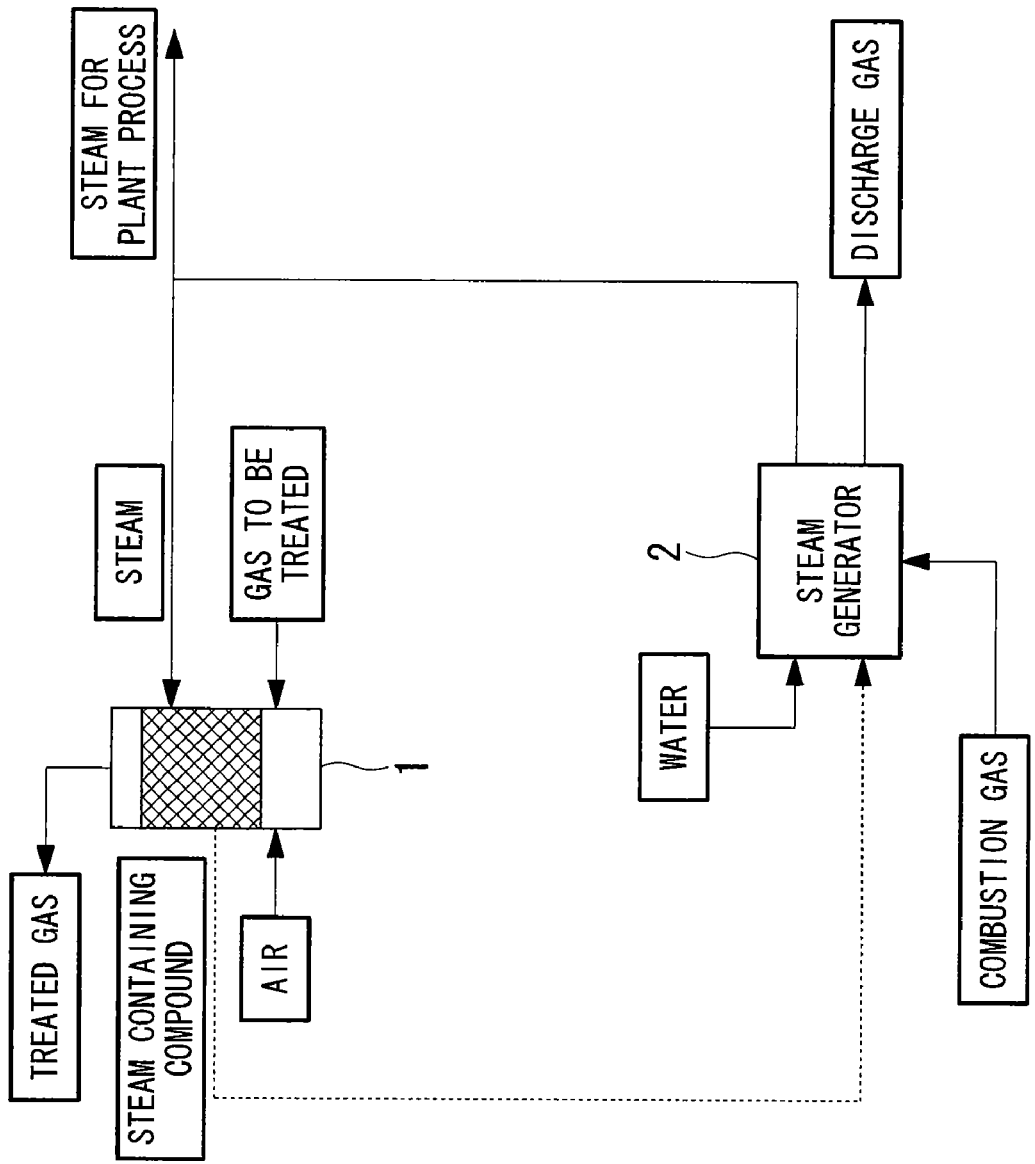
FIG. 1 is a system structural view illustrating a characteristic configuration of a volatile organic compound processing system according to a first embodiment of the present invention.

FIG. 1 is a system structural view illustrating a characteristic configuration of a volatile organic compound processing system according to a first embodiment of the present invention. In this figure, numerical reference 1 indicates an adsorption apparatus, and numerical reference 2 denotes a steam generating apparatus. The steam generating apparatus 2 corresponds to a combustion apparatus of the present invention.

In the adsorption apparatus 1, a volatile organic compound contained in untreated gas (or gas to be treated) is adsorbed in an (inside) adsorbent whereby the volatile organic compound is removed from the gas to be treated, and the volatile organic compound adsorbed in the adsorbent is desorbed with the aid of steam under a pressurized environment and mixed in the steam. As an example of the adsorbent, activated carbon may be used. Further, the pressurized environment is realized by supplying steam to the adsorption apparatus 1.

In the thus-structured adsorption apparatus 1, the gas to be treated is supplied from the outside, and therewith, steam is supplied from the steam generating apparatus 2. On the other hand, the treated gas with the volatile organic compound removed is discharged to the outside, and at the same time, steam containing compound the volatile organic compound is discharged and fed into the steam generating apparatus 2. Further, air (cooling air) is introduced in the thus-structured adsorption apparatus 1 from the outside in order to cool the adsorbent as shown in the figure.

The steam generating apparatus 2 performs both a function as a combustion apparatus which combusts or burns steam containing compound supplied from the adsorption apparatus 1 and fuel separately supplied, and a steam generating function in which steam is generated by the use of combustion heat produced by the former function. The steam generating apparatus 2 is, for example, an exhaust heat recovery boiler. The steam which has been generated in the steam generating apparatus 2 and which is in a pressurized state is supplied to the outside as plant process steam and is also supplied to the adsorption apparatus 1.

Hereinafter, a description will be given of a method of processing the volatile organic compound by means of the thus structured processing system. When the gas to be treated containing the volatile organic compound is supplied to the adsorption apparatus 1, the volatile organic compound is adsorbed in the adsorbent. Thereafter, the volatile organic compound adsorbed in the adsorbent is desorbed from the adsorbent due to operation of steam under a pressurized environment, and is mixed with the steam. Note that, although the pressurized environment is here realized by supplying steam to the adsorption apparatus 1, the method of actualizing such a pressurized environment is not limited to this.

The steam mixed with the volatile organic compound (steam containing compound) is supplied to the steam generating apparatus 2 while being maintained in a pressurized state. Thereafter, in the steam generating apparatus 2, the volatile organic compound in the steam containing compound is combusted together with fuel gas and thus rendered harmless. At the same time, in the steam generating apparatus 2, by the use of heat of the combustion gas, water is evaporated to generate steam. All or part of the thus-generated steam is supplied to the adsorption apparatus 1 while being maintained in a pressurized state, and then used for desorbing the volatile organic compound from the adsorbent.

According to the present embodiment, the steam containing the volatile organic compound is combusted in the steam generating apparatus 2, and therefore, it is possible to render the volatile organic compound completely harmless as compared to those processes heretofore known. Further, the steam containing the volatile organic compound is supplied to the steam generating apparatus 2 and combusted, and therefore, it is possible to reduce fuel (used in the heat generating apparatus 2) to an extent corresponding to heat of combustion of the volatile organic compound. In this event, comprehensive energy efficiency can be improved. Furthermore, steam is supplied to the steam generating apparatus 2, and therefore, it is possible to reduce the amount of NOx in the fuel gas discharged from the steam generating apparatus 2. In this event, deterioration of the surrounding environment due to NOx can be suppressed.

Moreover, in the steam generating apparatus 2, steam is generated by the use of heat of combustion, and therefore, it is possible to reduce energy necessary for generating steam as compared to a case in which steam is separately provided from another system. In this event, energy efficiency of the factory can comprehensively be improved.

In the meantime, in the present embodiment, by adopting the steam generating apparatus 2 as a combustion apparatus, the combusting process (or burning process) and the steam generating process of the steam containing compound are carried out together. However, a structure is possible in which the burning process and the steam generating process are separately carried out by respective apparatuses. As for a combusting process, any apparatus is suitable if it can sufficiently combust steam containing a volatile organic compound. For example, a gas turbine, a gas engine, a garbage incinerator, or a boiler in addition to the exhaust heat recovery boiler mentioned above can be used.

Second Embodiment

Figure 2:
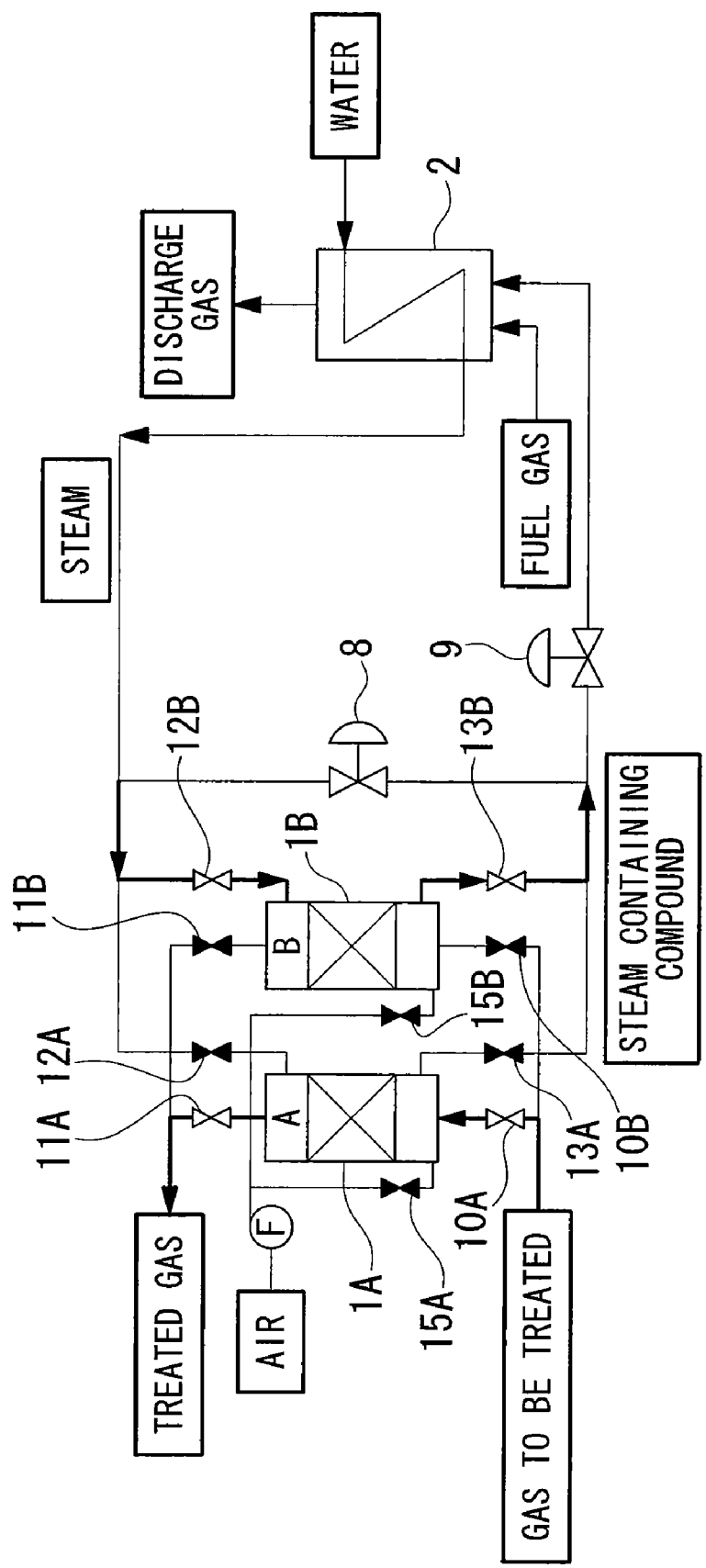
FIG. 2 is a system structural view illustrating a characteristic configuration of a volatile organic compound processing system according to a second embodiment of the present invention.
Figure 3A:
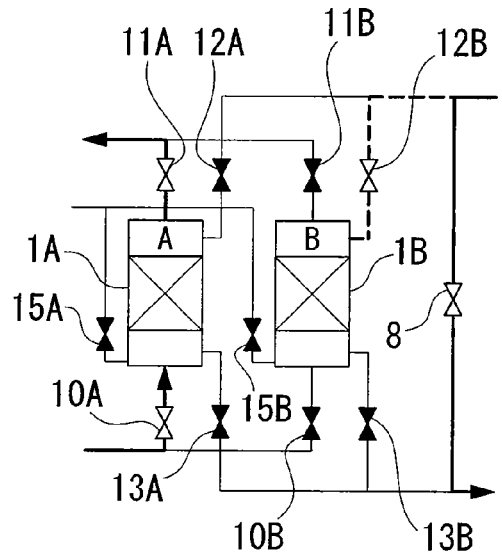
FIGS. 3A to 3H are schematic views illustrating operating states "a" to "h" of an adsorption apparatus in the second embodiment of the present invention.
Figure 3B:
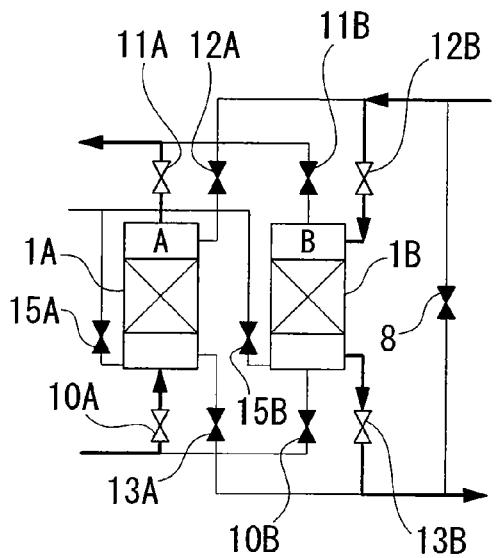
Figure 3C:
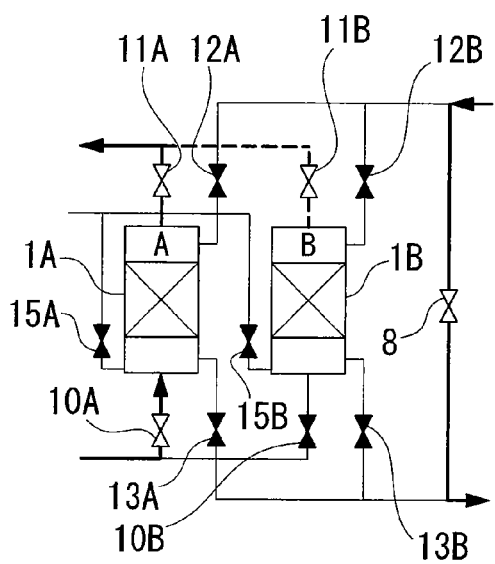
Figure 3D:
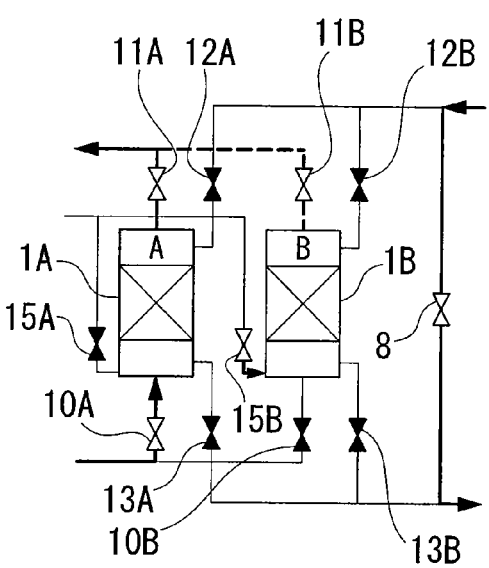
Figure 3E:
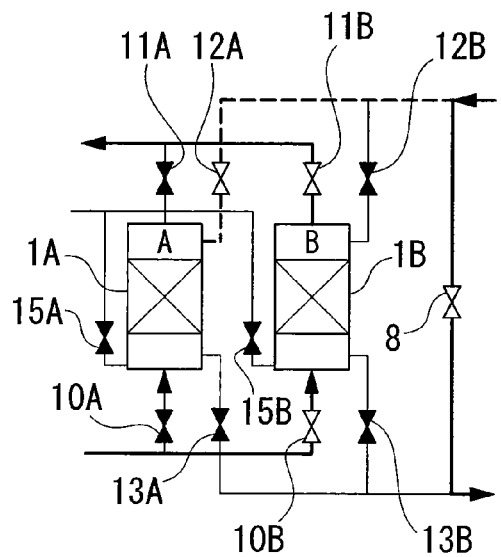
Figure 3F:
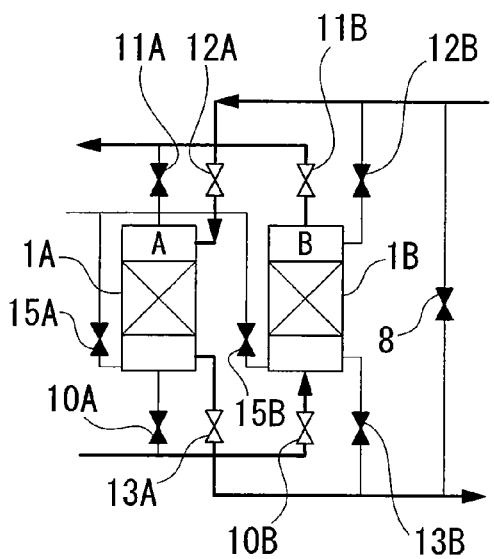
Figure 3G:
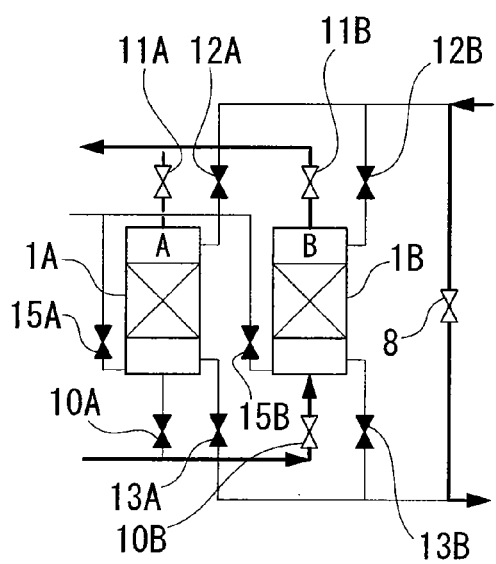
Figure 3H:
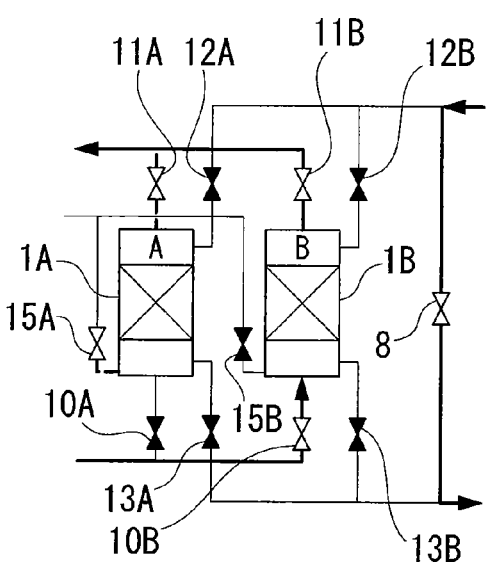

Next, a description will be given of a second embodiment of the present invention, with reference to a system structural view of FIG. 2.

Firstly, the reducing amount of NOx in the combustion gas discharged from the steam generating apparatus is changed in response to the amount of steam supplied to the steam generating apparatus 2. Accordingly, it is preferable to set the supply amount of steam with respect to the steam generating apparatus 2 such that the above-mentioned reducing amount is maximized. The amount of steam necessary for the steam generating apparatus 2 (or the combustion steam quantity) based on the above-mentioned point of view, and the amount of steam necessary for the adsorption apparatus 1 to effectively adsorb the volatile organic compound (or the compound adsorption steam quantity), are not necessarily the same. That is, the combustion steam quantity needs to be determined from the requirement for an effective reduction of NOx in the combustion gas, whereas the compound adsorption steam quantity needs to be determined from the requirement for effective adsorption of the volatile organic compound.

In the volatile organic compound processing system according to the first embodiment, the structure is such that steam containing compound discharged from the adsorption apparatus 1 is supplied at the same rate to the steam generating apparatus 2. Therefore, the quantity of the steam supplied to the adsorption apparatus 1 and the quantity of the steam supplied to the steam generating apparatus 2 are much the same. In other words, an inconvenience exists in that both of the aforesaid quantity of steam for combustion and the quantity of steam for adsorbing the compound cannot be satisfied.

Further, in the adsorption apparatus 1, the processes are repeatedly carried out in the order of the adsorption processing in which the volatile organic compound is adsorbed in the adsorbent, the desorption processing in which the volatile organic compound is desorbed from the adsorbent under a pressurized environment, and back to the adsorption processing. Consequently, an inconvenience exists in that the discharge gas containing the volatile organic compound cannot be consecutively processed.

The second embodiment solves such inconveniences involved in the above first embodiment and relates to a volatile organic compound processing or treatment system that is more intimately close to a real or actual one. In FIG. 2, components that are the same as those of the first embodiment are assigned the same reference numerals. In the following explanation, descriptions of such components similar to those of the first embodiment are appropriately omitted to avoid duplicate description.

In the system structural view of FIG. 2, numerical references 1A and 1B indicate adsorption units (hereinafter appropriately referred to as "adsorption apparatus"), numerical reference 8 indicates a steam bypass control valve, numerical reference 9 indicates a steam injection control valve, numerical references 10A and 10B indicate untreated gas supply valves (or gas to be treated supply valves), numerical references 11A and 11B indicate treated gas discharge valves, numerical references 12A and 12B indicate steam supply valves, numerical references 13A and 13B indicate steam discharge valves, numerical reference 14 indicates a cooling air fan, and numerical references 15A and 15B indicate cooling air supply valves.

The adsorption apparatus 1A (tower A) and the adsorption apparatus 1B (tower B) are similar to the adsorption apparatus 1 of the first embodiment. As shown in FIG. 2, the adsorption apparatuses 1A and 1B are disposed in parallel with respect to supply paths for the untreated gas and the steam, and as described hereinbelow, alternately implement the removal of a volatile organic compound with respect to the untreated gas (gas to be treated).

The steam bypass control valve 8 is an open/close valve which is provided between the inlet side of the steam supply valves 12A and 12B and the outlet side of the steam discharge valves 13A and 13B and which enables some of the steam to be supplied to the adsorption apparatuses 1A and 1B to directly flow into the steam injection control valve 9 without passing through the adsorption apparatuses 1A and 1B. It follows that the steam bypass control valve 8 is for supplying some of the steam discharged from the steam generating apparatus 2 to the steam injection control valve 9 with the adsorption apparatuses 1A and 1B being bypassed.

The steam injection control valve 9 is provided between the steam bypass control valve 8 and the steam generating apparatus 2 and controls the injection quantity of steam with respect to the steam generating apparatus 2. The untreated gas supply valve 10A is an open/close valve that is provided at an untreated gas supply port of the adsorption apparatus 1A (tower A) and which controls supply/shutoff of untreated gas with respect to the adsorption apparatus 1A. Meanwhile, the untreated gas supply valve 10B is an open/close valve that is provided at an untreated gas supply port of the adsorption apparatus 1B (tower B) and which controls supply/shutoff of untreated gas with respect to the adsorption apparatus 1B.

The treated gas discharge valve 11A is an open/close valve which is provided at a treated gas discharge port of the adsorption apparatus 1A and which controls the discharge/shutoff of treated gas from the adsorption apparatus 1A. The treated gas discharge valve 11B is an open/close valve which is provided at a treated gas discharge port of the adsorption apparatus 1B and which controls the discharge/shutoff of treated gas from the adsorption apparatus 1B. The steam supply valve 12A is an open/close valve which is provided at a steam supply port of the adsorption apparatus 1A and which controls the supply/shutoff of steam with respect to the adsorption apparatus 1A. The steam supply valve 12B is an open/close valve that is provided at a steam supply port of the adsorption apparatus 1B and which controls the supply/shutoff of steam with respect to the adsorption apparatus 1B.

The steam discharge valve 13A is an open/close valve that is provided at a steam containing compound discharge port of the adsorption apparatus 1A and which controls discharge/shutoff of the steam containing compound from the adsorption apparatus 1A. The steam discharge valve 13B is an open/close valve that is provided at a steam containing compound discharge port of the adsorption apparatus 1B and which controls discharge/shutoff of the steam containing compound from the adsorption apparatus 1B.

The cooling air fan 14 is a power source to supply cooling air to the adsorption apparatuses 1A and 1B. The cooling air supply valve 15A is an open/close valve which is provided between the cooling air fan 14 and the adsorption apparatus 1A and which controls supply/shutoff of cooling air with respect to the adsorption apparatus 1A. The cooling air supply valve 15B is an open/close valve which is provided between the cooling air fan 14 and the adsorption apparatus 1B and which controls supply/shutoff of cooling air with respect to the adsorption apparatus 1B.

In the thus-structured volatile organic compound processing system, as well as the steam containing compound discharged from the adsorption apparatus 1A and/or the adsorption apparatus 1B, the steam which has passed through the steam bypass control valve 8 is supplied to the steam injection control valve 9. As a result, the quantity of steam for combustion and the quantity of steam for adsorption of the compound can be set separately from one to another.

For example, provided that the combustion steam quantity is a flow rate R1, the compound adsorption quantity is a flow rate R2 (where R1>R2), if the difference in flow rate between R1 and R2 is supplied through the steam bypass control valve 8 to the steam injection control valve 9, the requirements for both of the combustion steam quantity and the compound adsorption quantity can be satisfied. The case where R1<R2 can be assumed. However, this is not practical because a condition where the compound adsorption steam quantity cannot entirely be treated by the gas turbine 2 is presented.

In the meantime, in the present volatile organic compound processing system, the steam injection control valve 9 is disposed at a downstream side of the steam bypass control valve 8 in the flow direction of the steam (namely, between the steam generating apparatus 2 and the steam bypass control valve 8). However, the steam injection control valve 9 may be disposed at an upstream side of the steam bypass control valve 8 (namely, between a heat exchanger 3 and the steam bypass control valve 8). With this structure, operation and effects that are similar to those mentioned above can also be obtained.

Figure 4:
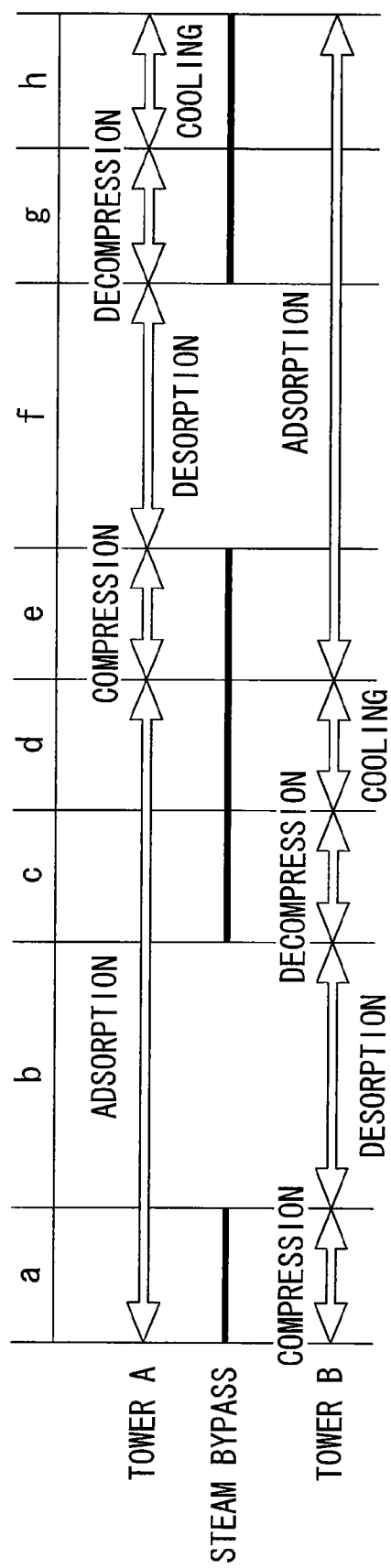
FIG. 4 is a timing chart illustrating a transition of operation of the adsorption apparatus in the second embodiment of the present invention.

Next, with reference to FIGS. 3A to 3H and FIG. 4, a detailed description will be given of operations of the adsorption apparatuses 1A and 1B that are provided as a pair in parallel. FIGS. 3A to 3H illustrate operating conditions "a" to "h" of the adsorption apparatuses 1A and 1B corresponding to open/close states of the steam bypass control valve 8, the untreated gas supply valves 10A and 10B, the treated gas discharge valves 11A and 11B, the steam supply valves 12A and 12B, the steam discharge valves 13A and 13B, and the cooling air supply valves 15A and 15B. Further, FIG. 4 is a timing chart illustrating a transition of the operating conditions "a" to "h", in chronological order, shown in FIGS. 3A to 3H. In the adsorption apparatuses 1A and 1B, the operating conditions "a" to "h" are repeatedly carried out, that is, the processes are carried out in the order of the adsorption process, the compression process, the desorption process, the decompression process, the cooling process, and back to the adsorption process.

Among the steam bypass control valve 8, the untreated gas supply valves 10A and 10B, the treated gas discharge valves 11A and 11B, the steam supply valves 12A and 12B, the steam discharge valves 13A and 13B, and the cooling air supply valves 15A and 15B illustrated in FIGS. 3A to 3H, every valve "in an opened state" is represented by a white valve symbol, and every valve "in a closed state" is represented by a black valve symbol. FIGS. 3A to 3H illustrate the open/close state of the steam bypass control valve 8. The steam bypass control valve 8 is, as described above, a valve which supplements the difference in flow rate between the combustion steam quantity and the compound adsorption steam quantity, but not a valve which directly controls the condition of the adsorption apparatuses 1A and 1B.

The operating condition "a" illustrates that the adsorption apparatus 1A is "in the adsorption state" and the adsorption apparatus 1B is "in the compression state". In other words, in the adsorption apparatus 1A, when the untreated gas supply valve 10A and the treated gas supply valve 11A are set to be in the open states and when the steam discharge valve 13A and the cooling air supply valve 15A are set to be in the closed states, the adsorption state is implemented where the untreated gas is sequentially supplied and the treated gas is sequentially discharged. Similarly, in the adsorption apparatus 1B, when the steam supply valve 12B is set to be in the open state and when the untreated gas supply valve 10B, the treated gas supply valve 11B, the steam discharge valve 13B and the cooling air supply valve 15B are set to be in the closed states, the compression state is implemented where only the steam is sequentially supplied.

As illustrated in FIG. 4, in the adsorption apparatus 1A, over a relatively long period of time of the operating conditions "a" through "d", the adsorption state is maintained. On the other hand, in the adsorption apparatus 1B, the state is shifted from the previous adsorption state to the compression state shown in the operating condition "a", and then to the desorption state shown in the operation condition "b" when the pressure has become a sufficient level. In other words, in the adsorption apparatus 1B, when the steam discharge valve 13B as well as the steam supply valve 12B are set to be in the open states, the desorption state is then implemented where the steam is sequentially supplied and the steam containing compound is sequentially discharged.

In the operating condition "b", when the organic solvent desorbed in the adsorbent in the adsorption apparatus 1B is sufficiently desorbed under pressure, the state in the adsorption apparatus 1B is shifted to the decompression state as illustrated in the operating condition "c". In other words, in the adsorption apparatus 1B, when the treated gas supply valve 11B is set to be in the open state and when the untreated gas supply valve 10B, the steam supply valve 12B, the steam discharge valve 13B and the cooling air supply valve 15B are set to be in the closed states, the compression state is implemented.

Then, when the pressure in the adsorption apparatus is lowered to normal pressure, the state in the adsorption apparatus 1B is shifted to the cooling state as illustrated in the operating condition "d". In other words, in the adsorption apparatus 1B, when the cooling air supply valve 15B as well as the treated gas supply valve 11B are set to be in the open states, the cooling air is supplied until the inside of the adsorption apparatus 1B is cooled to normal temperature. Further, in the adsorption apparatus 1B, as illustrated in the operating condition "e", when the untreated gas supply valve 10B and the treated gas discharge valve 11B are set to be in the open states and when the steam supply valve 12B, the steam discharge valve 13B, and the cooling air supply valve 15B are set to be in the closed states, the adsorption state is then implemented where the untreated gas is sequentially supplied and the treated gas is sequentially discharged.

On the other hand, in the adsorption apparatus 1A, in the adsorption apparatus 1B, when the steam supply valve 12A is set to be in the open state and when the untreated gas supply valve 10A, the treated gas discharge valve 11A, the steam supply valve 12A, the steam discharge valve 13A, and the cooling air supply valve 15A are set to be in the closed states, the compression state is then implemented where only the steam is sequentially supplied. The operating conditions "e" through "h" correspond to conditions formed on the assumption that the adsorption apparatus 1A and the adsorption apparatus 1B are interchanged with respect to the operating conditions "a" through "d". A further description is therefore omitted for abbreviation.

As can be seen from FIG. 4, the adsorption apparatus 1A and the adsorption apparatus 1B alternately repeat the adsorption of the volatile organic compound from the untreated gas and the desorption of the volatile organic compound from the adsorbent. Further, the adsorption of the volatile organic compound from the untreated gas, in other words, the removal of the volatile organic compound from the untreated gas is continuously carried out by shifting the conditions of the adsorption apparatus 1A and the adsorption apparatus 1B in the order of the operating conditions "a" through "h".

Incidentally, the number of adsorption apparatuses is not limited to two (i.e., the adsorption apparatus 1A and the adsorption apparatus 1B). By further providing a greater number of adsorption apparatuses and then operating these in parallel, the untreated gas may be continuously processed.

Third Embodiment

Figure 5:
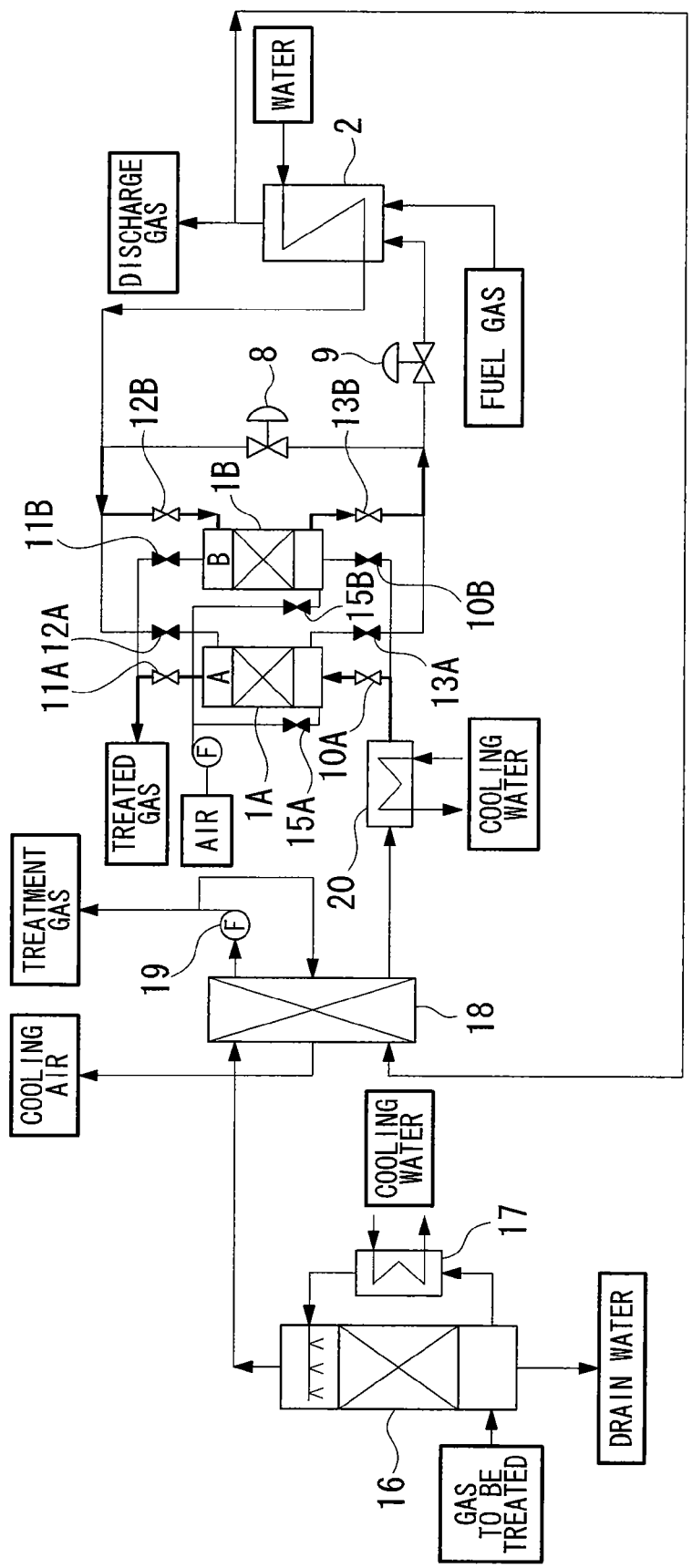
FIG. 5 is a system structural view illustrating a characteristic configuration of a volatile organic compound processing system according to a third embodiment of the present invention.

Next, a description will be given of a third embodiment of the present invention, with reference to FIG. 5. In the present third embodiment, a pre-process is applied to the untreated gas in order to improve treatment efficiency. FIG. 5 is a system structural view illustrating a volatile organic compound processing system according to the third embodiment. Note that, components that are the same as those of the volatile organic compound processing systems according to the first and second embodiments are assigned the same reference numerals.

In FIG. 5, numerical reference 16 indicates a dehumidifying tower, numerical references 17 and 20 indicate cooling apparatuses, numerical reference 18 indicates a concentrator, and numerical reference 19 indicates a fan. The dehumidifying tower 16 is a tower where the untreated gas is dehumidified by means of gas/liquid contact with cold water. In other words, the dehumidifying tower 16 is structured such that untreated gas is supplied from below and the untreated gas is concurrently discharged from above and that cold water is sprinkled from above to below. Accordingly, the untreated gas is cooled by gas-liquid contact with the cold water such that steam contained in the untreated gas is condensed and absorbed in the cold water. As a result, the untreated gas is dehumidified.

The cooling apparatus 17 is an apparatus where the water discharged from a bottom of the dehumidifying tower 16 is cooled and is supplied to the dehumidifying tower 16 as the aforesaid cold water. The dehumidifying tower 16 and the cooling apparatus 17 constitute the dehumidifier of the present embodiment.

The concentrator 18 concentrates the volatile organic compound contained in the untreated gas (the gas dehumidified) discharged from the dehumidifying tower 16 and discharges this to the cooling apparatus 20. More specifically, in the concentrator 18, the untreated gas is passed through powdered activated carbon in order to desorb and remove the volatile organic compound, and then discharged as treated gas, and at the same time, the volatile organic compound which has been adsorbed in the activated carbon is desorbed from the activated carbon by the use of the discharge gas. As a result, the discharge gas containing concentrated volatile organic compound is discharged as new gas to be treated (or new untreated gas). The discharge gas discharged from the steam generating apparatus 2 is high temperature gas of around 100° C. The volatile organic compound is desorbed from the activated carbon by means of this high temperature discharge gas.

The fan 19 is provided to forcibly discharge the aforesaid treated gas from the concentrator 18. The cooling apparatus 20 cools the new untreated gas (i.e., the new gas to be treated) and then supplies this to the untreated gas supply valves 10A and 10B. As described above, the new untreated gas is gas that contains the volatile organic compound concentrated in the discharge gas discharged from the steam generating apparatus 2. Therefore, this is high temperature gas close to 100° C. To cool this untreated gas possessing high temperature to a temperature suitable for treatment in the adsorption apparatus 1A and the adsorption apparatus 1B, the cooling apparatus 20 is provided.

In the present volatile organic compound processing system, the untreated gas is pre-processed by the dehumidifier 16 including the dehumidifying tower 16 and the cooling apparatus 17, and the concentrator 18. In other words, the untreated gas is subjected to a dehumidifying processing and a concentration processing. Thereafter, the untreated gas is subjected to a main processing (i.e., removal of the volatile organic compound) by the adsorption apparatus 1A and the adsorption apparatus 1B. In short, in the present adsorption apparatuses 1A and 1B, the new untreated gas containing the volatile organic compound whose concentration is higher than that of the aforesaid first and second embodiments is processed. Accordingly, it is possible to improve treatment efficiency.

The aforesaid FIG. 4, for example, illustrates the sequence where the adsorption processing is carried out throughout the operating conditions "a" to "d" by the adsorption apparatus 1A on the one hand and the sequence where the adsorption processing is carried out throughout the operating conditions "e" to "h" by the adsorption apparatus 1B on the other hand. In contrast, in the present third embodiment, by carrying out the pre-processing, it is possible for the time necessary for the adsorption processing to be shortened. Hence, the treatment efficiency for the untreated gas can correspondingly be improved.

Additionally, as the pre-processing, either one of the dehumidifying processing and the concentration processing can be adopted. If the steam in the untreated gas is removed therefrom by the dehumidifying processing, the concentration of the volatile organic compound in the untreated gas is significantly increased, correspondingly. Accordingly, even if the pre-processing is composed of only the humidifying processing, it is also possible to improve the treatment efficiency of the untreated gas. Whereas only the concentration processing significantly increases the concentration of the volatile organic compound, it is equally possible to improve the treatment efficiency of the untreated gas.

Fourth Embodiment

Figure 6:
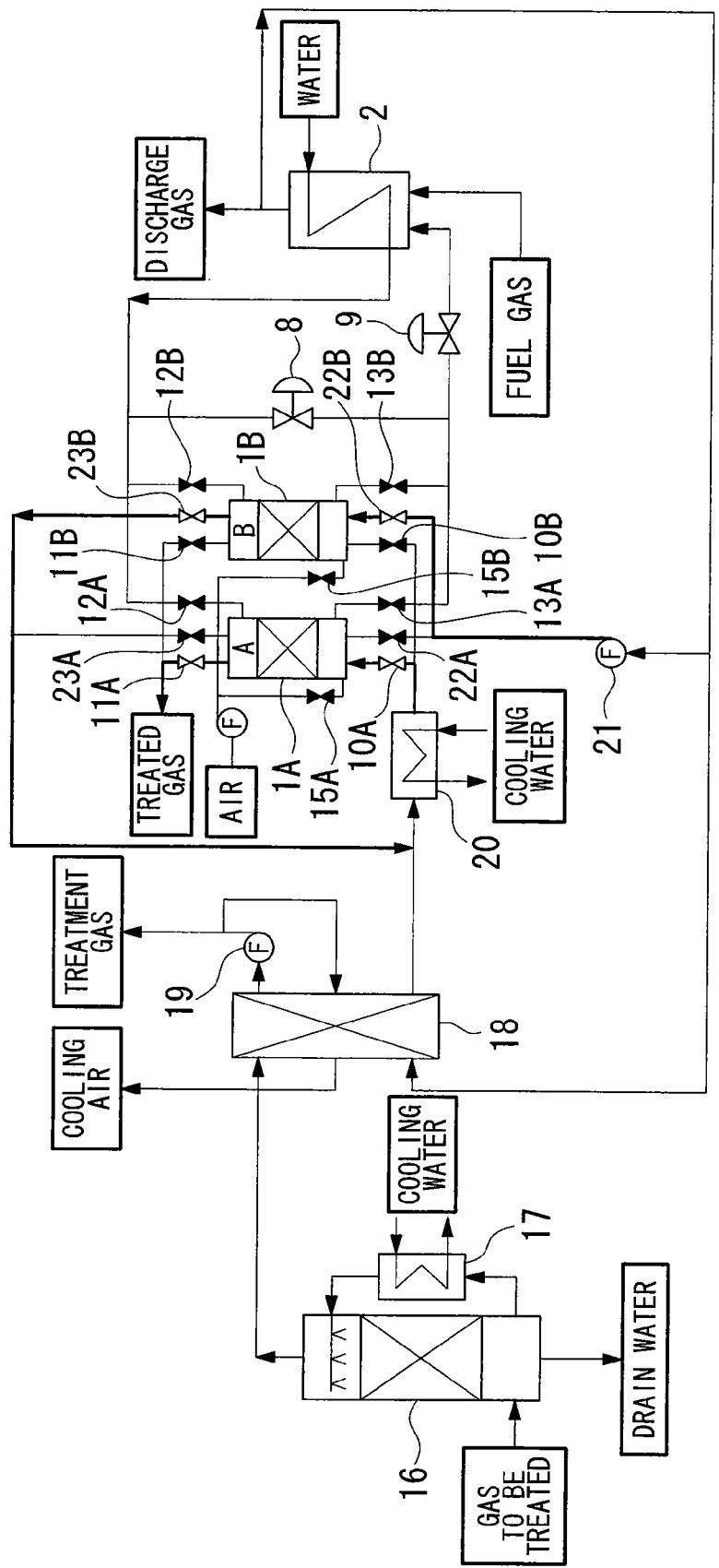
FIG. 6 is a system structural view illustrating a characteristic configuration of a volatile organic compound processing system according to a fourth embodiment of the present invention.

Next, a description will be given of a fourth embodiment of the present invention, with reference to FIG. 6. As illustrated in FIG. 6, the present volatile organic compound processing system is structured such that a fan 21, hot gas supply valves 22A and 22B, and hot gas discharge valves 23A and 23B are added to the volatile organic compound processing system according to the aforesaid third embodiment.

The fan 21 supplies to the hot gas supply valves 22A and 22B discharge gas (hot gas) which has been discharged from the steam generating apparatus 2. The hot gas supply valve 22A is provided between the fan 21 and a discharge gas supply port of the adsorption apparatus 1A, and implements supply/shutoff of the discharge gas with respect to the adsorption apparatus 1A. On the other hand, the hot gas supply valve 22B is provided between the fan 21 and a discharge gas supply port of the adsorption apparatus 1B, and implements supply/shutoff of the discharge gas with respect to the adsorption apparatus 1B.

The hot gas discharge valve 23A is provided between a discharge gas discharge port of the adsorption apparatus 1A and an untreated gas supply port of the cooling apparatus 20, and implements supply/shutoff of the discharge gas discharged from the adsorption apparatus 1A (and/or the adsorption apparatus 1B) with respect to the untreated gas supply port of the cooling apparatus 20. The hot gas discharge valve 23B is provided between a discharge gas discharge port of the adsorption apparatus 1B and the untreated gas supply port of the cooling apparatus 20, and implements supply/shutoff of the discharge gas discharged from the adsorption apparatus 1B (and/or the adsorption apparatus 1A) with respect to the untreated gas supply port of the cooling apparatus 20.

Adsorption apparatuses 1A and 1B are those such as illustrated in FIGS. 3A to 3H and described in the second embodiment mentioned above. In the compression process, by supplying steam for compression to the adsorption apparatuses 1A and 1B, which are under normal temperature conditions, some of the steam for compression is condensed and then becomes drain water. It is probable that, in this drain water, the volatile organic compound, which has been adsorbed in the adsorbent, is contained or dissolved, although the quantity is likely very small.

The present embodied volatile organic compound processing system provides a solution by means of which such inconveniences as above are resolved or settled. In this system, a heating process is provided between the adsorption process and the compression process as illustrated in FIGS. 3A to 3H and FIG. 4, and is carried out by the use of the aforesaid fan 21, the hot gas supply valves 22A and 22B, the hot gas discharge valves 23A and 23B, and discharge gas discharged from the steam generating apparatus 2.

The same or a similar heating process is carried out in every one of the adsorption apparatuses 1A and 1B. Thus, as a representative thereof a description will be given of the adsorption apparatus 1B, for the convenience of explanation. When the adsorption process in which the untreated gas is supplied to the adsorption apparatus 1B and the treated gas is discharged is completed, only the hot gas supply valve 22B and the hot gas discharge valve 23B are opened. Due to this, the discharge gas discharged from the fan 21 is supplied to the adsorption apparatus 1B whereby the inside thereof is heated. This discharge gas has a temperature of around 100° C. as described above, and therefore, it is possible to heat the inside of the adsorption apparatus 1B to a sufficient level such that condensation of the steam does not occur.

As a result, it is possible to prevent the occurrence of a situation where steam condenses in a subsequent step, namely, in the compression process by the use of the steam. Therefore, inconveniences caused by the drain water in the adsorption apparatuses 1A and 1B such as described above can be resolved or settled. To summarize, with the present volatile organic compound processing system, it is possible to effectively use, as an energy source, the volatile organic compound contained in the drain water in the adsorption apparatuses 1A and 1B and is also possible to realize a further saving of energy consumption by combusting the volatile organic compound as a part of fuel to be used in the steam generating apparatus 2.

If there is no need for processing the volatile organic compound contained in the drain water of the adsorption apparatuses 1A and 1B, then the drain water may be supplied to the discharge gas discharge port of the steam generator 3, and in turn evaporated and discharged into the atmosphere. Because the water quantity of the drain water is not so substantial, it is possible to sufficiently evaporate the drain water by supplying it to the discharge gas discharge port of the steam generating apparatus 2.

Fifth Embodiment

Figure 7:
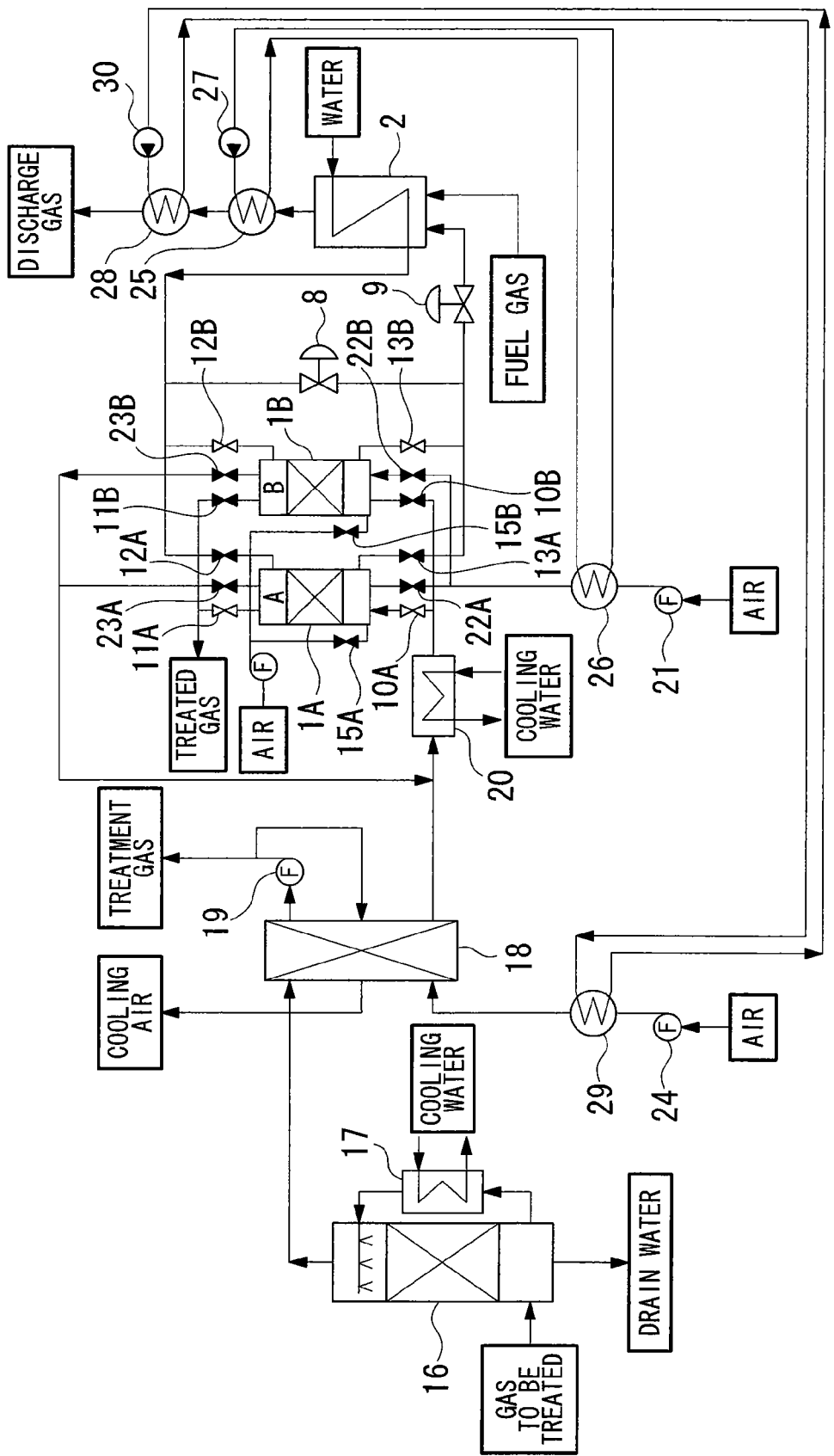
FIG. 7 is a system structural view illustrating a characteristic configuration of a volatile organic compound processing system according to a fifth embodiment of the present invention.

Finally, a description will be given of a fifth embodiment of the present invention with reference to FIG. 7. The present volatile organic compound processing system corresponds to a structure in which the steam generating apparatus 2 is disposed and separated far apart from other apparatuses, and then corresponds to a modified example of the aforesaid third and fourth embodiments.

In the volatile organic compound processing system of the third embodiment, the discharge gas discharged from the steam generating apparatus 2 is utilized as a heat source in order to concentrate the untreated gas in the concentrator 18. On the other hand, in the volatile organic compound processing system of the fourth embodiment, the discharge gas discharged from the steam generating apparatus 2 is utilized as a heat source in order to control generation of the drain water in the adsorption apparatuses 1A and 1B.

In connection therewith, in such a volatile organic compound processing system in which the steam generating apparatus 2 is disposed and separated from the concentrator 18 and/or the adsorption apparatuses 1A and 1B, it is necessary to construct a relatively large diameter duct over a long distance in order to supply the discharge gas to the concentrator 18 and/or the adsorption apparatuses 1A and 1B, and is also necessary to provide a relatively large power for ventilation. This resultantly invites an increase in equipment cost and an increase in running costs.

In response thereto, in the present volatile organic compound processing system, unlike the structure of the aforesaid fourth embodiment, air, instead of the discharge gas, is supplied to the fan 21, and air, instead of the discharge gas, is supplied from a fan 24 to the concentrator 18. Further, in the present system, the discharge air from the fan 21 is heated by a first heating apparatus comprised of heat exchangers 25 and 26 and a pump 27 on the one hand, and discharge air from the fan 24 is heated by a second heating apparatus comprised of heat exchangers 28 and 29 and a pump 30 on the other hand.

The heat exchanger 25 is disposed in the vicinity of the discharge gas discharge port of the steam generating apparatus 2 and carries out heat exchange between the discharge gas discharged from the fan 21 and a predetermined heat transfer medium. The heat exchanger 26 is disposed in the vicinity of an air discharge port of the fan 21 and carries out heat exchange between the air discharged from the fan 21 and the aforesaid heat transfer medium. The pump 27 is disposed on the midway of a heat transfer medium circulation path provided between the heat exchanger 25 and the heat exchanger 26 and carries out circulation of the heat transfer medium between the heat exchanger 25 and the heat exchanger 26.

The heat exchanger 28 is disposed in the vicinity of the discharge gas discharge port of the steam generating apparatus 2 and carries out heat exchange between the discharge gas and a predetermined heat transfer medium. The heat exchanger 29 is disposed in the vicinity of an air discharge port of the fan 24 and carries out heat exchange between the air discharged from the fan 24 and the heat transfer medium. The pump 30 is disposed on the midway along a heat transfer medium circulation path provided between the heat exchanger 28 and the heat exchanger 29 and carries out circulation of the heat transfer medium between the heat exchanger 28 and the heat exchanger 29.

In the thus-structured volatile organic compound treatment system, the discharge gas discharged from the steam generating apparatus 2 is not directly supplied to the concentrator 18 and/or the adsorption apparatuses 1A and 1B, and instead, by the use of the first and second heating apparatuses, heat of the discharge gas is transferred to the air discharged from the fans 21 and 24 to thereby heat the air and render the heated air, and thereafter, this heated air as hot gas is supplied to the concentrator 18 and the adsorption apparatuses 1A and 1B.

Here, by using a liquid heat transfer medium having a relatively large heat capacity as an example of the above heat transfer medium, respective dimensions of the heat transfer medium circulation paths can be substantially reduced as compared with ducts for supplying the discharge gas to the concentrator 18 and the adsorption apparatuses 1A and 1B. Further, if the heat capacity of the heat transfer medium is large, the circulation flow rate of the heat transfer medium can be suppressed or maintained at a relatively low level, and as a result, it is possible to maintain lower power of the fans 27 and 30 than the ventilation power for supplying the discharge gas to the concentrator 18a and the adsorption apparatuses 1A and 1B.

In this event, with the present volatile organic compound processing system, it is possible to prevent an increase in equipment cost and an increase in running costs, in the case in which the steam generating apparatus 2 is disposed away from the concentrator 18 and/or the adsorption apparatuses 1A and 1B.

What is claimed is:

1. A method of processing a volatile organic compound, comprising:
adsorbing in an adsorbent a volatile organic compound contained in a gas to be treated;
desorbing the volatile organic compound adsorbed in the adsorbent from the adsorbent by mixing the adsorbent with steam, under a pressurized environment;
combusting a separately supplied fuel and the steam mixed with the volatile organic compound in a steam generating apparatus to create combustion gas, generating steam by the use of heat of the combustion gas; and using a part of the generated steam to desorb from the adsorbent the volatile organic compound adsorbed in the adsorbent, wherein adsorption of the volatile organic compound with respect to the adsorbent, and desorption of the volatile organic compound from the adsorbent are alternately carried out in parallel.

2. The method as recited in claim 1, wherein a part of the steam generated by the use of the combustion gas is supplied to the adsorbent, into which the volatile organic compound has been adsorbed and to desorb the volatile organic compound adsorbed in the adsorbent, and combusting the rest of the steam generated by the use of the combustion gas by the steam generating apparatus.

3. The method as recited in claim 1, wherein a pre-process for concentrating the volatile organic compound is applied to the gas to be treated, and thereafter, the volatile organic compound is adsorbed in the adsorbent.

4. The method as recited in claim 3, wherein the pre-process comprises either one or both of (i) a concentration process in which the volatile organic compound contained in the gas to be treated is adsorbed in the adsorbent, and thereafter, the volatile organic compound is desorbed from the adsorbent by the use of hot gas to thereby be concentrated, and (ii) a dehumidifying process in which the water content is removed from the gas to be treated.

5. The method as recited in claim 1, wherein the volatile organic compound is adsorbed in the adsorbent, and thereafter, the volatile organic compound in the adsorbent is heated by the use of hot gas before it is desorbed by the use of steam.

6. The method as recited in claim 4, wherein the hot gas is discharge gas of combustion gas that has been supplied to generate steam.

7. The method as recited in claim 4, wherein the hot gas is air that has been heated by heat transfer with discharge gas of combustion gas that has been supplied to generate steam.

8. A processing system of a volatile organic compound, comprising:

an adsorption apparatus which adsorbs in an adsorbent a volatile organic compound contained in gas to be treated, and desorbs the volatile organic compound adsorbed in the adsorbent from the adsorbent by the use of steam and mixing it with the steam, under a pressurized environment, the adsorption apparatus comprising first and second adsorption units;

a pre-processing device for pre-processing the gas to be treated;

a switching apparatus which switches between the first and second adsorption units so that adsorption of the volatile organic compound in the adsorbent of the first adsorption unit and desorption of the volatile organic compound from the adsorbent of the second adsorption unit are alternately carried out in parallel; and a steam-generating combustion apparatus operative to combust a separately supplied fuel with the steam mixed with the volatile organic compound to create a combustion gas, and further operative to generate steam using heat of the combustion gas, wherein at least a part of steam generated by the steam-generating apparatus is directed to the adsorption apparatus for desorbing the volatile organic compound adsorbed in the adsorbent.

9. The processing system as recited in claim 8, further comprising:

a steam bypass control valve which controls a flow of steam directly supplied to the combustion apparatus without being passed through the adsorption apparatus.

10. The processing system as recited in claim 8, further comprising:

a pre-processing apparatus for concentrating a volatile organic compound contained in the gas to be treated, before adsorbing the volatile organic compound in the adsorbent.

11. The processing system as recited in claim 10, wherein the pre-processing apparatus comprises either one or both of (i) a concentrator where the volatile organic compound contained in the gas to be treated is adsorbed in the adsorbent, and thereafter, the volatile organic compound is desorbed from the adsorbent by the use of hot gas to thereby be concentrated, and (ii) a dehumidifier where the water content is removed from the gas to be treated.

12. The processing system as recited in claim 8, wherein the volatile organic compound in the adsorbent is heated by the use of hot gas before it is desorbed by the use of steam.

13. The processing system as recited in claim 11, wherein the hot gas is discharge gas of combustion gas supplied to generate steam.

14. The processing system as recited in claim 11, further comprising:

a heating apparatus where air is heated by heat transfer with discharge gas of combustion gas supplied to generate steam, and wherein the hot gas is the heated air discharged from the heating apparatus.

\* \* \* \* \*